United States Patent
Arth et al.

[15] 3,679,717
[45] July 25, 1972

[54] STEROID COMPOUNDS AND PROCESS

[72] Inventors: Glen E. Arth, Cranford; Gary H. Rasmusson, Watchung, both of N.J.

[73] Assignee: Merck & Co., Inc., Rahway, N.J.

[22] Filed: Feb. 13, 1970

[21] Appl. No.: 11,332

[52] U.S. Cl. .................................................. 260/397.45
[51] Int. Cl. ..................................................... C07c 169/32
[58] Field of Search ............................. 260/397.4, 397.45

[56] References Cited

UNITED STATES PATENTS 3,488,346   1/1970   Dorfman et al. .................. 260/239.55

FOREIGN PATENTS OR APPLICATIONS 1,021,198   3/1966   Great Britain ..................... 260/397.4

Primary Examiner—Elbert L. Roberts
Attorney—Henry H. Bassford, Jr., J. Jerome Behan and I. Louis Wolk

[57] ABSTRACT

The invention disclosed herein relates to 3,11$\beta$-dihydroxy-9$\alpha$-fluoro-16$\alpha$-methyl-17$\alpha$-acyloxy-pregn-4-en-20-one, and to 3-ester and 3-ether derivatives thereof; more particularly it relates to certain preferred embodiments, namely to the specific compounds 3-methoxy (or acetoxy)-9$\alpha$-fluoro-11$\beta$-hydroxy-16$\alpha$-methyl-17$\alpha$-acetoxy-pregn-4-en-20-one. These compounds are prepared by reacting the corresponding 3-ketone with an alkali metal borohydride thereby forming the corresponding 3-hydroxy derivative, and reacting the latter with an appropriate etherifying or acylating agent. These 3-esters and 3-ethers of 3,11$\beta$-dihydroxy-9$\alpha$-fluoro-16$\alpha$-methyl-17$\alpha$-acyloxy-pregn-4-en-20-one possess progestational activity and are valuable as estrus regulating agents.

5 Claims, No Drawings

STEROID COMPOUNDS AND PROCESS

In preparing the new compounds, a 9α-fluoro-11β-hydroxy-16α-methyl-17α-acyloxy-pregn-4-en-3,20-dione, such as 9α-fluoro-11β-hydroxy-16α-methyl-17α-acetoxy-pregn-4-en-3,20-dione, is reacted with an alkali metal borohydride, such as sodium borohydride, preferably in methanolic solution, thereby selectively reducing the ketone radical attached to the C–3 carbon atom to hydroxy, thereby forming a 3,11β-dihydroxy-9α-fluoro-16α-methyl-17α-acyloxy-pregn-4-en-20-one, such as 3,11β-dihydroxy-9α-fluoro-16α-methyl-17α-acetoxy-pregn-4-en-20-one, and the like.

This 3,11β-dihydroxy-9α-fluoro-16α-methyl-17α-acyloxy-pregn-4-en-20-one is then reacted with an esterifying or etherifying agent to form the corresponding 3-ester or 3-ether derivative. The esterifying reaction is conveniently conducted by bringing together the 3,11β-dihydroxy-9α-fluoro-16α-methyl-17α-acyloxy-pregn-4-en-20-one and an acyl anhydride, such as acetic anhydride, in the presence of a base such as pyridine. When acetic anhydride in pyridine is used as the esterifying agent, the reaction is ordinarily allowed to proceed at room temperature overnight, and the 3-ester product purified by crystallization from an organic solvent, such as methanol, to give the 3,17α-diacyloxy-9α-fluoro-11β-hydroxy-16α-methyl-pregn-4-en-20-one such as 3,17α-diacetoxy-9α-fluoro-11β-hydroxy-16α-methyl-pregn-4-en-20-one. The etherification reaction is ordinarily carried out by bringing together, under substantially anhydrous conditions, the 3,11β-dihydroxy-9α-fluoro-16α-methyl-17α-acyloxy-pregn-4-en-20-one, a lower aliphatic alcohol, such as methanol, in the presence of an acid catalyst, such as perchloric acid, at a temperature below about 0° C., preferably between about 0° C. and −10° C. The resulting suspension gradually dissolves, and the 3-ether product precipitates. The later is conveniently recovered by adding aqueous bicarbonate solution, diluting the resulting mixture with water, and recovering the precipitated material by filtration. The ether is then crystallized from methanol to give the 3-alkoxy-9α-fluoro-11β-hydroxy-16α-methyl-17α-acyloxy-pregn-4-en-20-one, such as 3-methoxy-9α-fluoro-11β-hydroxy-16α-methyl-17α-acetoxy-pregn-4-en-20-one, and the like.

The following examples illustrate methods of carrying out the present invention, but it is to be understood that these examples are given for purposes of illustration and not of limitation.

EXAMPLE 1

To a stirred suspension of about 3.85 g. of 9α-fluoro-11β-hydroxy-16α-methyl-17α-acetoxy-pregn-4-en-3,20-dione in about 300 ml. of methanol containing 1 milliliter of water is added, portionwise, while maintaining the temperature of the mixture at about 0° C., approximately 390 mg. of sodium borohydride. The resulting mixture is stirred at about 0° C. for 2.5 hours, then diluted with water, and the aqueous mixture evaporated to remove the major portion of the methanol. The concentrated aqueous-mixture is diluted with water, and the precipitated material is recovered by filtration, washed, and crystallized from hexane-ethylacetate to give approximately 2.0 g. of 3,11β-dihydroxy-9α-fluoro-16α-methyl-17α-acetoxy-pregn-4-en-20-one; m.p. 238°–242° C. dec. Evaporation of the filtrate gives a white solid which, upon crystallization from methanol, yields a second crop of about 0.9 g; m.p. 194° C. dec.

A mixture of 100 mg. of 3,11β-dihydroxy-9α-fluoro-16α-methyl-17α-acetoxy-pregn-4-en-20-one, 0.5 mg. acetic anhydride and 0.5 ml. pyridine is kept at room temperature overnight. The resulting mixture is evaporated under a stream of nitrogen to form a clear glassy substance. This material is crystallized, first from heptane-methylene chloride, and then from methanol, to give about 80 mg. of 3,17α-diacetoxy-9α-fluoro-11β-hydroxy-16α-methyl-pregn-4-en-20-one; m.p. 208° C. (dec).

EXAMPLE 2

A suspension of about 2.0 g. of 3,11β-dihydroxy-9α-fluoro-16α-methyl-17α-acetoxy-pregn-4-en-20-one in about 40 ml. of anhydrous methanol is cooled to approximately −10° C., and to the suspension is added, dropwise with stirring, about 0.6 ml. of 60 percent aqueous perchloric acid solution. The reaction mixture is maintained at about −10° C. for approximately 2 hours, and is then allowed to warm to about 0° C. At the latter temperature, the suspension gradually dissolves, and at the end of about 2 hours, the product begins to crystallize from the methanolic reaction mixture. The resulting mixture is maintained at about 0° C. for an additional period of about 6–7 hours, approximately 10 ml. of a 5 percent aqueous sodium bicarbonate solution is added, and the resulting mixture is maintained at about 5° C. for a period of about 15 hours. The mixture is then diluted with water, and the material which precipitates is recovered by filtration, and crystallized from methanol to give about 1.2 g. of 3-methoxy-9α-fluoro-11β-hydroxy-16α-methyl-17α-acetoxy-pregn-4-en-20-one; m.p. 197°–198° C.

Various changes and modifications may be made in carrying out the present invention without departing from the spirit and scope thereof. Insofar as these changes and modifications are within the purview of the annexed claims, they are to be considered part of this invention.

What is claimed is:

1. A compound selected from the group consisting of 3,11β-dihydroxy-9α-fluoro-16α-methyl-17-fluoro--(lower alkanoyloxy)-pregn-4-en-20one, and 3-lower alkanoyl ester and 3-lower alkyl ether derivatives thereof.

2. The compound as defined in claim 1 having the chemical name 3,17α-bis(lower alkanoyloxy)-9α-fluoro-11β-hydroxy-16α-methyl-pregn-4-en-20-one.

3. The compound as defined in claim 1 having the chemical name 3,17α-diacetoxy-9α-fluoro-11β-hydroxy-16α-methyl-pregn-4-en-20-one.

4. The compound as defined in claim 1 having the chemical name 3-(lower alkoxy)-9α-fluoro-11β-hydroxy-16α-methyl-17α-(lower alkanoyloxy)-pregn-4-en-20-one.

5. The compound as defined in claim 1 having the chemical name 3-methoxy-9α-fluoro-11β-hydroxy-16α-methyl-17α-acetoxy-pregn-4-en-20-one.

* * * * *